United States Patent Office 2,854,459
Patented Sept. 30, 1958

2,854,459
SYNTHESIS OF STEROIDS

William S. Knowles, Kirkwood, Mo., and Bernard S. Wildi, Dayton, Ohio, assignors to Monsanto Chemical Company, St. Louis, Mo., a corporation of Delaware No Drawing. Application April 15, 1954
Serial No. 423,508

8 Claims. (Cl. 260—339)

This invention relates to new and useful steps in the total synthesis of steroids of the skeletal structure

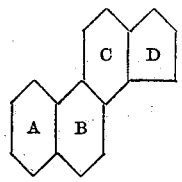

and to the new intermediates obtained thereby. In particular this invention relates to mono-ozonides obtained by the addition of one chemical equivalent of ozone to the double bond of a fused cyclohexeno grouping of the structure

wherein the said cyclohexeno grouping is the terminal cyclic grouping of a polycarbocyclic compound having a polyhydrophenanthrene nucleus characterized by the BCD ring fusion system of the steroid compounds. In the steroidal art said fused cyclohexeno grouping is referred to as 6-membered ring D, and will be so referred to hereinafter.

The novel steps of the process of this invention comprise ozonolysis followed by reductive decomposition of the mono-ozonide so produced. These steps may be represented schematically as follows

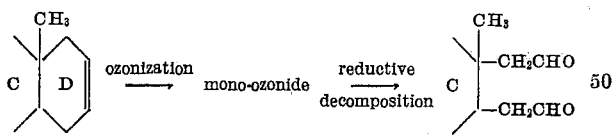

The dialdehyde so obtained upon ring closure or cyclization provides for 5-membered ring D as follows

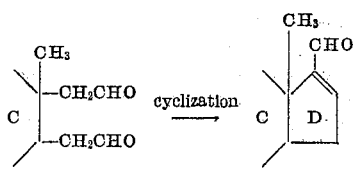

The 5-membered ring D so produced is identical with ring D of $\Delta^{9(11),16}$-bisdehydro-21-norprogesterone which as pointed out in Woodward's "The Total Synthesis of Steroids," J. A. C. S., vol. 74, pp. 4223 ff., possesses a skeletal structure identical with that of the adrenal cortical hormones.

The mechanism of the ozonolysis is not understood with certainty, and while it is believed that the first product is an unstable molozonide which rearranges at once to an iso-ozonide, it is to be understood that this invention is not limited to any assumption as to chemical structure of the resultant ozonide but pertains broadly to the ozonide obtained by the addition of one chemical equivalent of ozone to the double bond of a fused cyclohexeno grouping of the structure

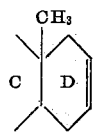

wherein the said cyclohexeno grouping is the terminal grouping of a polycarbocyclic compound having a polyhydrophenanthrene nucleus characterized by the BCD ring fusion system of the steroid compounds. As illustrative of the reactants contemplated by this invention in the preparation of the new ozonides are the anti-trans-polyhydrophenanthrenes such as anti-trans-8a-methyl-$\Delta^{6,9,10a(1)}$-octahydrophenanthren-2-ones of the structure

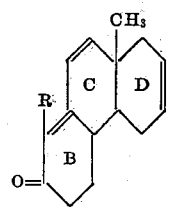

where R is hydrogen or methyl; anti-trans-8a-methyl-$\Delta^{6,10a(1)}$-decahydrophenanthren-2-ones of the structure

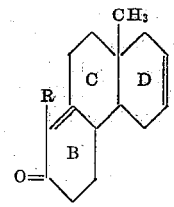

where R is hydrogen or methyl, and the like in any of their optically active forms, or racemic mixtures thereof, or total unresolved mixture of isomers. Other reactants particularly contemplated are those anti-trans-polyhydrochrysenes wherein the respective fused rings contain not more than one double bond, as for example anti-trans-8-keto-12a-methyl-$\Delta^{2,6a(7),11a(11)}$-dodecahydrochrysenes of the structure

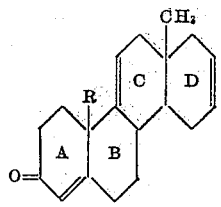

where R is hydrogen or methyl; anti-trans-8-keto-10a,12a-dimethyl-$\Delta^{2,11a(11)}$-tetradecahydrochrysene; anti-trans-anti-trans-8,11-diketo-12a-methyl - $\Delta^{2,6a(7)}$ - tetradecahydrochrysenes of the structure

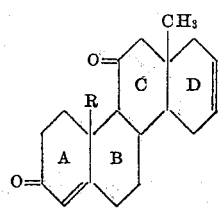

where R is hydrogen or methyl; anti-trans-anti-trans-8-keto-10a,12a-dimethyl-$\Delta^{2,6a(7)}$-tetrahydrochrysene; antitrans-anti-trans-8-keto-11-hydroxy-12a-methyl - $\Delta^{2,6a(7)}$-tetradecahydrochrysenes of the structure

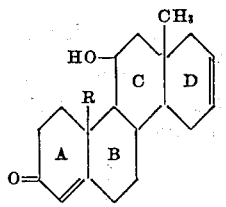

where R is hydrogen or methyl; trans-anti-trans-anti-trans- and cis-anti-trans-anti-trans-8-keto-10a,12a - dimethyl-$\Delta^2$-hexadecahydrochrysene and the like in any of their optically active isomeric forms, or racemic mixtures thereof, or total unresolved mixture of isomers.

In general the ozonolysis step is accomplished by dissolving the polycarbocyclic compound to be mono-ozonized in a suitable inert solvent, and while maintaining a fluid system and the temperature below about 25° C., passing ozone into the solution until substantially one chemical equivalent of ozone has been absorbed. The temperature during the ozonolysis should be kept below 25° C. and preferably in the range of −30° C. to +20° C. although temperatures as low as −80° C. are operative.

Among the inert solvents which may be used in the ozonolysis step are acetic acid, chloroform, methylene dichloride, carbon tetrachloride, methyl alcohol, ethyl acetate, and the like. While acetic acid is the preferred solvent, other inert solvents may be employed instead of or in conjunction with acetic acid provided the system remains fluid at the ozonolysis temperature.

When solvents other than acetic acid are employed in the ozonolysis step, they are replaced by acetic acid prior to the reductive decomposition of the ozonide. Such may be accomplished by adding acetic acid to the ozonide solution and fractionating under reduced pressure to remove the solvent, additional acetic acid being added when necessary. The ozonide in acetic acid is then reductively decomposed to the dialhyde. By "reductively decomposed" is meant that the ozonide is decomposed under "reductive conditions," that is in the absence of oxidizing agents, whether added or formed in situ by the products of the decomposition of the ozonide. For the reductive decomposition of the ozonide, temperatures in the range of 0° to 50° C. are ordinarily employed. Of the reductive decomposition agents zinc dust and acetic acid are preferred. However, catalytic reduction to the dialdehyde, as for example, with palladium is also operative. The resultant dialdehyde may then by cyclized according to conventional procedures, as for example by heating a solution of the dialdehyde in an aromatic hydrocarbon solvent in the presence of piperidine acetate.

The process of this invention is particularly useful in the conversion of 10, 13-dimethyl-$\Delta^{16}$-D-homosteroids, particularly the 3-keto-$\Delta^{16}$-D-homoandrostenes, to the corresponding $\Delta^{16}$-21-norprogesterone. As illustrative of such is the following

*Example I*

5 parts by weight of dl-3-keto-$\Delta^{4,9(11),16}$-D-homoandrostatriene

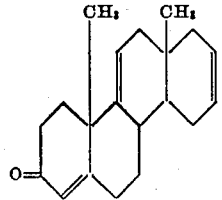

is dissolved in 750 parts by weight of chloroform and to the solution so obtained while maintaining the temperature at about 0° C. is added ozone at the rate of about 0.0145 part by weight per minute, over a period of approximately 58.5 minutes. The chloroform is then removed under reduced pressure at about 20° C. The ozonide, i. e. the 16,17-ozonide of dl-3-keto-$\Delta^{4,9(11),16}$-D-homoandrostatriene, so obtained is a yellow viscous oil, which oil is then dissolved in approximately 50 parts by weight of glacial acetic acid. To the solution so obtained is added 5 parts by weight of zinc dust. The mix so obtained is shaken for about 10 minutes at about 20° C., and filtered. The filter cake is washed with glacial acetic acid and then with diethyl ether. The washings and original filtrate are combined and then extracted with chloroform. Upon evaporation of the solvent of the extract approximately 5.66 parts by weight of an oily substance consisting predominately of the dialdehyde

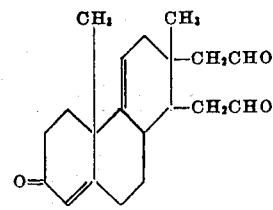

is obtained. The oil is taken up with approximately 440 parts by weight of benzene and thereto is added approximately 0.5 part by weight of glacial acetic acid and approximately 0.5 part by weight of piperidine. The mix so obtained is heated at about 60° C. for one hour in an atmosphere of nitrogen. The resultant mix is cooled and washed successively with 5% hydrochloric acid, 5% aqueous sodium carbonate, and finally with water. The organic layer is dried over magnesium sulfate, and then subjected to vacuum distillation to remove the solvent. The residue after recrystallization from methyl alcohol according its infrared spectrum is $dl$ - $\Delta^{9(11),16}$ - 21-norprogesterone

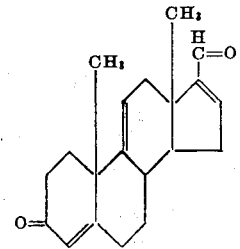

In a similar manner 17-formyl-$\Delta^{4,9(11),16}$-19-norandrostatrien-3-one is obtained from dl-anti-trans-8-keto-12a-methyl-$\Delta^{2,6a(7),11a(11)}$-dodecahydrochrysene, the 2,3-ozonide being obtained as an intermediate.

*Example II*

5 parts by weight of the levo rotatory form of 3-keto-$\Delta^{4,9(11),16}$ - D - homoandrostatriene, M. P. 174 – 175° C. $[\alpha]_D^{25}$-22.9°, is dissolved in 750 parts by weight of chloroform and to the solution so obtained while maintaining the temperature at about 0° is added ozone at the rate of about .0145 part by weight per minute, over a period of approximately 58.5 minutes. The chloroform is then removed under reduced pressure at about 20° C. The ozonide so obtained is a yellow viscous oil, which oil is then dissolved in approximately 50 parts by weight of glacial acetic acid. To the solution so obtained is added 5 parts by weight of zinc dust. The mix so obtained is shaken for about 10 minutes at about 20° C., and filtered. The filter cake is washed with glacial acetic acid and then with diethyl ether. The washings and original filtrate are combined and then extracted with chloroform. Upon evaporation of the solvent of the extract approximately 5.66 parts by weight of an oily substance consisting predominately of the dialdehyde is obtained. The oil is taken up approximately 440 parts by weight of benzene and thereto is added approximately 0.5 part by weight of glacial acetic acid and approximately 0.5 part by weight of piperidine. The mix so obtained is heated at about 60° C. for one hour in an atmosphere of nitrogen. The resultant mix is cooled and washed successively with 5% hydrochloric acid, 5% aqueous sodium carbonate, and finally with water. The organic layer is dried over magnesium sulfate, and then subjected to vacuum distillation to remove the solvent. The residue after recrystallization from methyl alcohol is the dextro-rotatory form of $\Delta^{9(11),16}$-21-norprogesterone, M. P. 160–161.5° C. $[\alpha]_D^{25}+290°$.

In a similar manner 11-keto-$\Delta^{16}$-21-norprogesterone is obtained from 3,11-diketo-$\Delta^{4,16}$-D-homoandrostadiene, the 16,17-ozonide of 3,11-diketo-$\Delta^{4,16}$-D-homoandrostadiene being obtained as an intermediate. Also, similarly 11-hydroxy-$\Delta^{16}$-21-norprogesterone is obtained from 3-keto-11-hydroxy-$\Delta^{4,16}$-D-homoandrostadiene, the 16,17-ozonide of 3-keto-11-hydroxy-$\Delta^{4,16}$-D-homoandrostadiene being obtained as an intermediate.

As further illustrative of this invention is the following:

*Example III*

7.1 parts by weight of $dl$-anti-trans-1,8a-dimethyl-$\Delta^{6,9,10a(1)}$-octahydrophenanthren-2-one

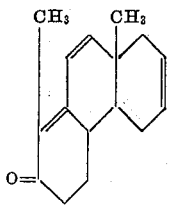

is dissolved in ethylene dichloride and to the solution so obtained while maintaining the temperature at about −50° C. is added one chemical equivalent of ozone in the form of an ethylene dichloride solution (0.0282 N ozone). Upon disappearance of the blue color the system is blown with nitrogen at about 25° C. to remove the ethylene dichloride. The white solid residue is the 6,7-ozonide of $dl$-anti-trans-1,8a-dimethyl-$\Delta^{6,9,10a(1)}$-octahydrophenanthren-2-one. The ozonide so obtained is dissolved in approximately 75 parts by weight of glacial acetic acid. To the solution so obtained is added 7 parts by weight of zinc dust. The mix so obtained is shaken for about 10 minutes at about 20° C. and then filtered. The residue is washed with glacial acetic acid and the washings combined with the original filtrate. The acetic acid is removed under vacuum and the residue taken up with chloroform. The chloroform solution is then washed with aqueous sodium bicarbonate and then with water. Upon subjecting the solution to vacuum distillation approximately 7.9 parts by weight of the dialdehyde

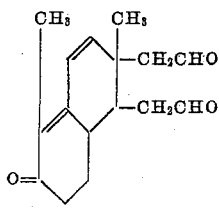

is obtained. The dialdehyde is then taken up with approximately 630 parts by weight of benzene and thereto is added approximately 1.7 parts by weight of piperidine and approximately 8.5 parts by weight of glacial acetic acid. The mix so obtained is heated at about 60° C. for about one hour in an atmosphere of nitrogen. The resultant mass is cooled and washed successively with 5% hydrochloric acid, 5% aqueous sodium bicarbonate, and finally with water. The organic layer is dried over magnesium sulfate, and then subjected to vacuum distillation. The residue after recrystallization from chloroform and then from methanol gave white crystalline $dl$-anti-trans-3a,6-dimethyl - 3 - formyl-$\Delta^{2,4,5a(6)}$-hexahydropentanthren-7-one

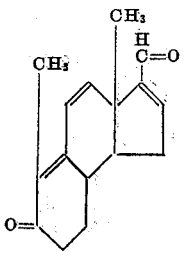

*Example IV*

Employing the procedure of Example III but replacing $dl$-anti-trans-1,8a - dimethyl - $\Delta^{6,9,10a(1)}$-octahydrophenanthren-2-one with an equimolecular weight of $dl$-anti-trans-8a-methyl-$\Delta^{6,9,10a(1)}$-octahydrophenanthren-2-one

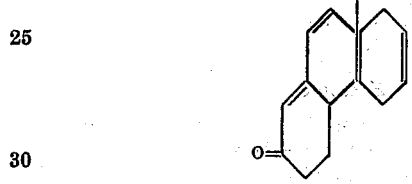

the 6,7-ozonide is obtained as a white solid, which 6,7-ozonide upon reductive decomposition with zinc dust and glacial acetic acid yields the dialdehyde

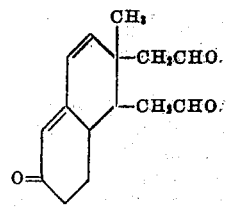

which dialdehyde upon heating in the presence of piperidine acetate yields white solid $dl$-anti-trans-3a-methyl-3-formyl-$\Delta^{2,4,5a(6)}$-hexahydropentanthren-7-one

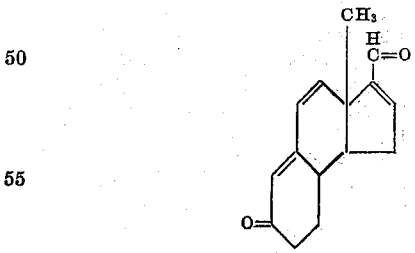

*Example V*

Employing the procedure of Example III but replacing $dl$-anti-trans-1,8a-dimethyl - $\Delta^{6,9,10a(1)}$ - octahydrophenanthren-2-one with an equimolecular weight of the levorotatory form of anti-trans-1,8a-dimethyl-$\Delta^{6,10a(1)}$-decahydrophenanthren-2-one

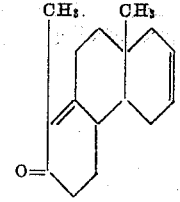

the 6,7-ozonide is obtained, which 6,7-ozonide upon reductive decomposition with zinc dust and glacial acetic acid yields the dialdehyde

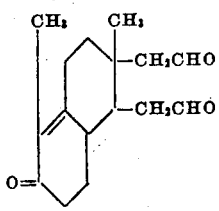

which dialdehyde upon heating in the presence of piperidine acetate yields as a white solid the levo-rotatory form of anti-trans-3a,6-dimethyl-3-formyl-$\Delta^{2,5a(6)}$-octahydropentanthren-7-one

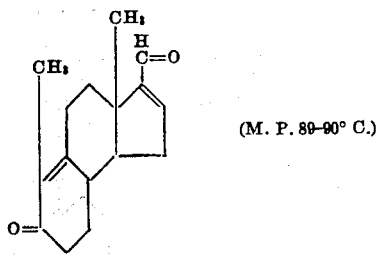

(M. P. 89–90° C.)

Example VI

Employing the procedure of Example III but replacing dl-anti-trans-1,8a-dimethyl-$\Delta^{6,9,10a(1)}$-octahydrophenanthren-2-one with an equimolecular weight of dl-anti-trans-1,8a-dimethyl-$\Delta^{6,10a(1)}$-decahydrophenanthren-2-one, the 6,7-ozonide is obtained as a white solid, which 6,7-ozonide upon reductive decomposition with zinc dust and glacial acetic acid yields the oily dialdehyde, which dialdehyde upon heating in the presence of piperidine acetate yields dl-anti-trans-3a,6-dimethyl-3-formyl-$\Delta^{2,5a(6)}$-octahydropentanthren-7-one, a white crystalline solid melting at 118–120° C.

While this invention has been described with respect to certain embodiments it is not so limited and it is to be understood that variations and modifications thereof which are obvious to those skilled in the art may be made without departing from the spirit or scope of the invention.

What is claimed is:

1. A mono-ozonide selected from the group consisting of (A) the 6,7-ozonide of an anti-trans-8a-methyl-$\Delta^{6,10a(1)}$-polyhydrophenanthen-2-one whose respective fused rings contain not more than one double bond and whose 1-carbon atom possesses a substituent of the structure —$(CH_2)_nH$ where $n$ is an integer from 0 to 1, and (B) the 2,3-ozonide of an anti-trans-8-keto-12a-methyl-$\Delta^{2,6a(7)}$-polyhydrochrysene whose fused ring B is saturated and whose respective fused rings A, C and D contain not more than one double bond and whose 10a-carbon atom possesses a substituent of the structure —$(CH_2)_nH$ where $n$ is an integer from 0 to 1.

2. A process for making a mono-ozonide selected from the group consisting of that which comprises adding one chemical equivalent of ozone to the 6,7-double bond of an anti-trans-8a-methyl-$\Delta^{6,10a(1)}$-polyhydrophenanthren-2-one whose respective fused rings contain not more than one double bond and whose 1-carbon atom possesses a substituent of the structure —$(CH_2)_nH$ where $n$ is an integer from 0 to 1 in an inert organic fluid medium at a temperature in the range —30° C. to 20° C., and that which comprises adding one chemical equivalent of ozone to the 2,3-double bond of an anti-trans-8-keto-12a-methyl-$\Delta^{2,6a(7)}$-polyhydrochrysene whose fused ring B is saturated and whose respective fused rings A, C and D contain not more than one double bond and whose 10a-carbon atom possesses a substituent of the structure —$(CH_2)_nH$ where $n$ is an integer from 0 to 1, in an inert organic fluid medium at a temperature in the range of —30° C. to 20° C.

3. The 6,7-ozonide of anti-trans-1,8a-dimethyl-$\Delta^{6,9,10a(1)}$-octahydrophenanthren-2-one.

4. The 6,7-ozonide of the levo-rotatory isomer of anti-trans-1,8a-dimethyl-$\Delta^{6,9,10a(1)}$-octahydrophenanthren-2-one.

5. The 16,17-ozonide of 3-keto-$\Delta^{4,9(11),16}$-D-homoandrostatriene.

6. The 16,17-ozonide of the levo-rotatory isomer of 3-keto-$\Delta^{4,9,(11),16}$-D-homoandrostatriene.

7. The process which comprises reacting substantially one chemical equivalent of ozone with anti-trans-1,8a-dimethyl $\Delta^{6,9,10a(1)}$-octahydrophenanthren-2-one in an inert organic fluid medium at a temperature in the range of —30° C. to 20° C., and reductively decomposing the 6,7-ozonide so obtained to a dialdehyde of the general formula

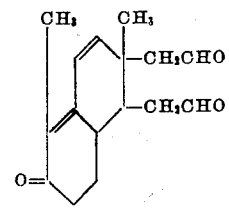

with zinc dust and acetic acid at a temperature in the range of 0° C. to 50° C.

8. The process which comprises reacting substantially one chemical equivalent of ozone with 3-keto-$\Delta^{4,9(11),16}$-D-homoandrostatriene in an inert organic fluid medium at a temperature in the range of —30° C. to 20° C., and reductively decomposing the 16,17-ozonide so obtained to form a dialdehyde of the general formula

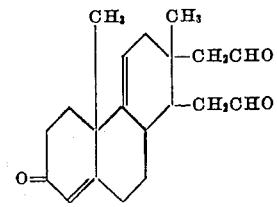

with zinc dust and acetic acid at a temperature in the range of 0° C. to 50° C.

References Cited in the file of this patent

UNITED STATES PATENTS

| | | |
|---|---|---|
| 2,433,848 | Julian et al. | Jan. 6, 1948 |
| 2,523,742 | Warner et al. | Sept. 26, 1950 |
| 2,759,928 | Farrar et al. | Aug. 21, 1956 |

OTHER REFERENCES

Harries: Annalen, 343, 369–374 (1905).
Badger: Rec. Trav. Chim., 71, 468–472 (1952).
Long: Chemical Reviews, 27, pp. 451–4, 459–462 (1940).
Durland et al.: J. A. C. S., 60, 1501–5 (1938).
Durland et al.: J. A. C. S., 61, 429–433 (1939).